W. M. GRISCOM.
Apple-Paring Machine.

No. 168,985.   Patented Oct. 19, 1875.

Witnesses,
Harry Smith
Hubert Howson

William M. Griscom
by his attorneys,
Howson and son

UNITED STATES PATENT OFFICE.

WILLIAM M. GRISCOM, OF READING, PA., ASSIGNOR TO HIMSELF, MATHAN HARBSTER, AND WILLIAM HARBSTER, OF SAME PLACE.

IMPROVEMENT IN APPLE-PARING MACHINES.

Specification forming part of Letters Patent No. 168,985, dated October 19, 1875; application filed June 16, 1875.

CASE B.

*To all whom it may concern:*

Be it known that I, WILLIAM M. GRISCOM, of Reading, Berks county, Pennsylvania, have invented an Improvement in Apple-Paring Machines, of which the following is a specification:

The object of my invention is to so combine a fixed blade with the frame and pronged spindle of an apple-paring machine, that the said blade will remove from the apple that portion of the skin which the ordinary paring-blade fails to remove; and this object I attain in the manner which I will now proceed to describe, reference being had to the accompanying drawing, in which—

Figure 1:
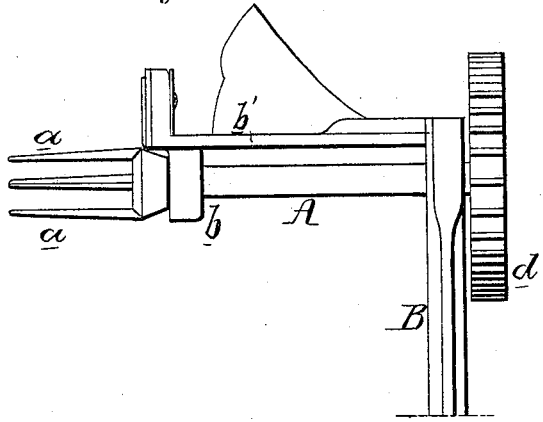
Figure 2:
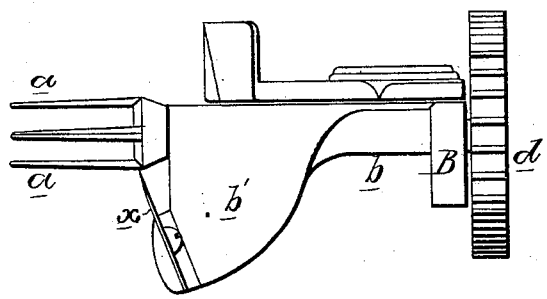
Figure 3:
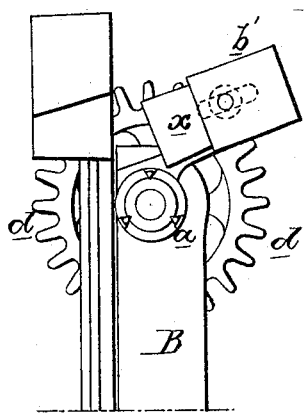

Figure 1 is a side view of sufficient of an apple-paring machine to illustrate my invention; Fig. 2, a plan view of Fig. 1, and Fig. 3, a front view.

The spindle A, with its prongs $a$ for receiving the apple to be pared, is of the usual construction, and is arranged to revolve in the frame B, and in a bearing on the arm $b$ of the frame, the spindle being provided with a pinion, $d$, into which gears a driving-wheel, as in ordinary apple-paring machines. There is the usual paring-arm, which is common to other machines of this class, and which is too well known to need either description or illustration. The blade of this arm, while it effectually removes from the apple the greater portion of its skin, leaves a small portion of the latter at the base of the apple; and, in order to remove this small portion, I attach to a projection, $b'$, on the arm $b$ of the frame, a blade, $x$, which occupies the inclined position shown in the drawing, so as to effectually remove from the base of the apple the remnants of skin left by the main paring-blade. This blade $x$ is so secured to the projection $b'$ of the frame that it can be readily adjusted thereon in respect to the pronged end of the spindle A.

I desire it to be understood that I do not claim, broadly, the use of a supplementary knife for removing the skin from the base of the apple, as one mode of effecting the removal is shown in the case of A. Rippien, filed May 31, 1875; but

I claim as my invention—

The combination, in an apple-paring machine, of a blade, $x$, attached to the frame, with the pronged spindle A, substantially as specified.

In testimony whereof I have signed my name to this specification in the presence of two subscribing witnesses.

WILLIAM M. GRISCOM.

Witnesses:
HENRY C. ENGLAND,
S. D. DYER.